J. F. O'CONNOR.
FRICTION DRAFT GEAR FOR RAILWAY CARS.
APPLICATION FILED JUNE 6, 1919.
1,398,704.
Patented Nov. 29, 1921.
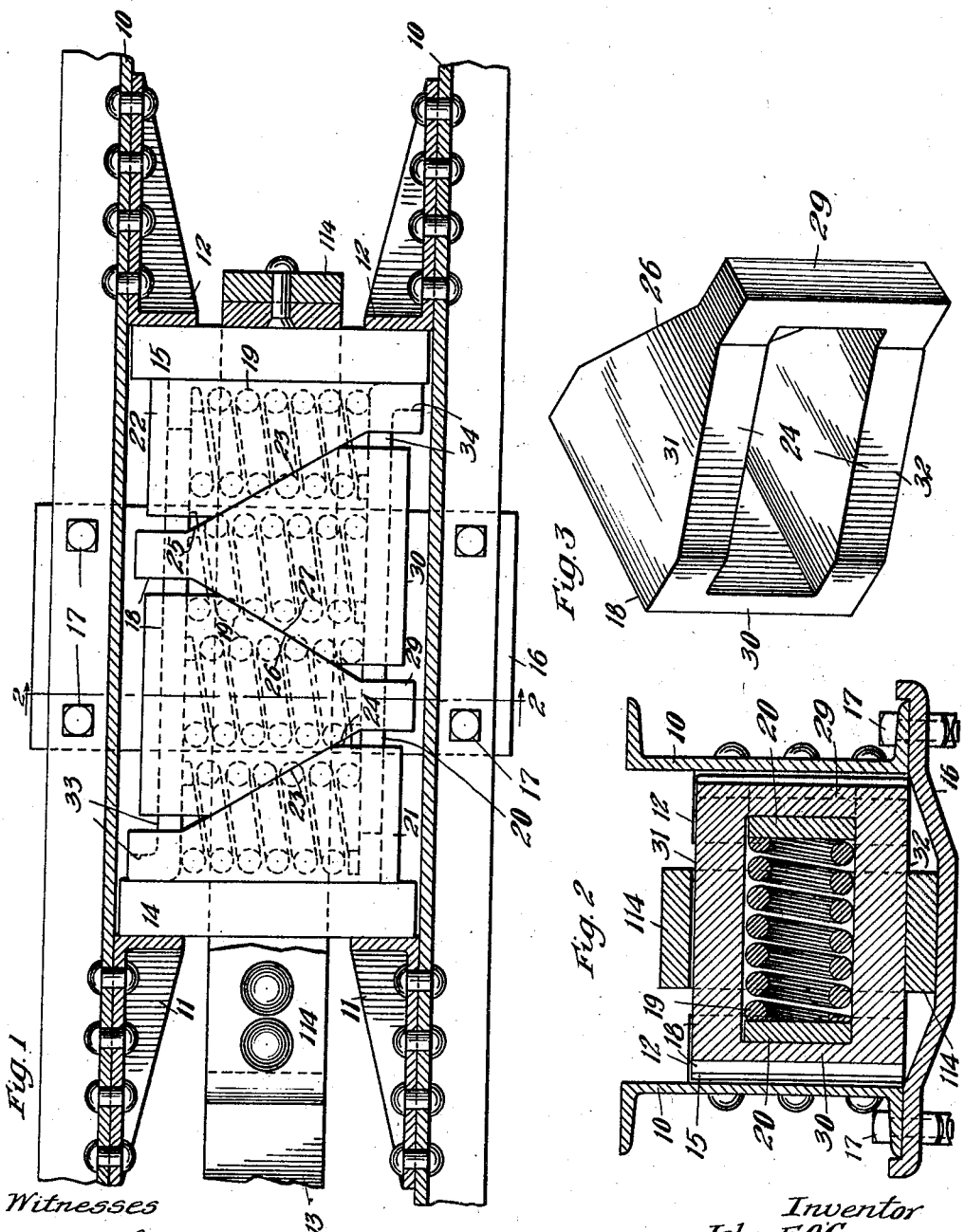
Witnesses
Wm. Geiger
Inventor
John F O'Connor
By Geo. I. Haight
Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION DRAFT-GEAR FOR RAILWAY-CARS.

1,398,704.  Specification of Letters Patent.   Patented Nov. 29, 1921.

Application filed June 6, 1919. Serial No. 302,256.

*To all whom it may concern:*

Be it known that I, JOHN F. O'CONNOR, a citizen of the United States, residing at Chicago, in the county of Cook and State of Illinois, have invented a certain new and useful Improvement in Friction Draft-Gears for Railway-Cars, of which the following is a full, clear, concise, and exact description, reference being had to the accompanying drawings, forming a part of this specification.

My invention relates to improvements in friction draft gears for railway cars.

The object of my invention is to provide a simple and efficient draft gear.

In the drawings forming a part of this specification, Figure 1 is a horizontal plan showing the draft sills and stops with the draw bar and other elements of the draft rigging mounted therein and shown in top plan view. Fig. 2 is a cross section taken on line 2—2 of Fig. 1. Fig. 3 is a perspective view of one of the friction elements.

Referring to the drawings, the numerals 10—10 indicate draft sills suitably spaced apart and having secured to the inner faces thereof the front stop members 11—11 and the rear stop members 12—12. A draw bar is indicated at 13 having attached thereto a yoke 114, which is adapted to surround the followers and compression-resisting elements hereinafter more fully described. 14 indicates a front follower; 15 a rear follower; 16 a supporting plate adapted to hold the parts in their position between the sills and secured to the draft sills by suitable means—as, for instance, the bolts 17—17. The compression-resisting elements include the following devices mounted between the front and rear followers: The friction elements 18; the spring elements 19, and the lateral followers 20. The friction elements 18 consist of the counter-part front and rear elements 21 and 22, respectively. The front element 21 is seated against the front follower 14 and the rear element 22 against the rear follower 15. Each of these elements has an angular friction face 23 adapted to engage against an adjacent friction face of one of the intermediate friction elements hereinafter more fully described. The intermediate friction elements comprise a plurality, preferably two members, counterparts of each other, one of which is shown in perspective of Fig. 3 of the drawings. The said elements are oppositely arranged, as shown in Fig. 1 of the drawings, the front element having a friction face 24 engaging the adjacent friction face 23 of the front element 21, and the rear intermediate element having a friction face 25 adapted to engage the friction face 23 of the rear friction element 22. Each of the intermediate elements is provided with the coacting friction faces 26 and 27. It will be noted that all of the friction elements are hollow, having closed ends 29 and 30 and closed tops and bottoms 31 and 32, and that the interengaging friction faces between said elements are upon the sides thereof. Associated with the said friction elements are the lateral followers 33 and 34. These followers extend along the inner lateral walls of the friction elements and have frictional engagement therewith. At one end of each of said lateral followers is provided an off-set portion or shoulder adapted to secure the same in a fixed position in reference to one of the end friction elements or its adjacent end follower—for instance, in Fig. 1 of the drawings the upper lateral follower is fixed in its position with reference to the front friction element 21 and the lower lateral follower is fixed in its position in reference to the rear friction element.

A series of laterally-arranged springs are mounted within the friction elements and between the lateral followers. In the particular embodiment of my invention illustrated in the drawings, these springs 19 are four in number, there being one for each of the friction elements employed.

On forward movement of the draw bar, the front follower 14 will be prevented from retreating by the front stop members 11 and the yoke will draw the rear follower 15 forwardly, compressing the friction elements between the front and rear followers, causing the rear friction element to move laterally in one direction and the front friction element to move laterally in the opposite direction. The front intermediate friction element will move laterally in the same direction as the rear friction element, and the rear intermediate friction element will move laterally in the same direction as the front friction element. During this movement, the friction will be generated between each of the end friction elements and their adjacent end followers. Also friction will be generated between the friction faces of the various friction elements and also there will be friction between the lateral followers and the adjacent internal friction faces of the various friction elements. It will be noted that one free end of each of the lateral followers is in normal position of the parts sufficiently spaced apart from the adjacent end follower to permit the compression of the parts between the end followers. During the movement of the parts just described, the laterally-arranged springs will tend to resist the approaching movement of the lateral followers toward each other and thus insure, in addition to the spring resistance, the frictional resistance of the various interengaging parts. It will also be noted that the laterally-arranged springs are positioned sufficiently apart to permit the approaching movement of the end followers toward each other. On rearward movement of the draw bar, the rear follower 15 is prevented from retreating by the rear stop members 12, the draw bar drives the front follower 14 rearwardly and the action of the parts between the front and rear followers hereinbefore described will thereupon ensue.

I claim:

1. In a draft rigging for railway cars, in combination, front and rear followers, a plurality of laterally-movable friction elements between said followers, a pair of lateral followers within and common to all of said friction elements and springs mounted between said lateral followers.

2. In a draft rigging for railway cars, in combination: front and rear followers; a plurality of hollow laterally movable friction elements interposed between said followers; and laterally arranged spring units within said friction elements, the number of said spring units equalizing the number of said friction elements.

3. In a draft rigging for railway cars, in combination: front and rear followers, front and rear friction elements in engagement with said followers; intermediate friction elements, each of said friction elements being hollow and provided with a longitudinally arranged internal friction face; lateral followers within the friction elements frictionally engaging said faces thereof and slidable thereon in a direction parallel to the center line of draft; and springs within the friction elements mounted between said lateral followers.

4. In a draft rigging for railway cars, in combination, front and rear laterally-movable friction elements, intermediate opposed laterally-movable friction elements and springs interposed between said elements, each of said intermediate friction elements having converging friction surfaces all arranged at less than a right angle to the axis of the draft rigging.

5. In a friction shock absorbing mechanism, the combination with a pair of end friction elements, the same being of like construction but oppositely disposed; of a pair of oppositely disposed intermediate friction elements of like construction but differing in construction from the end friction elements, the intermediate friction elements having frictional engagement with each other and with the end friction elements along surfaces all extending at an angle less than a right angle relatively to the center line of draft; a plurality of transversely arranged springs within the friction elements, one end friction element and one intermediate friction element moving laterally in the opposite direction to the other end and intermediate friction elements upon relative approach of the end friction elements.

6. In a draft rigging for railway cars, front and rear followers, front and rear laterally-movable frictional elements in engagement with the followers, intermediate laterally-movable frictional elements and a pair of lateral followers within and common to all of the friction elements and springs mounted between the said lateral followers.

7. In a draft rigging for railway cars, in combination, front and rear followers, front and rear oppositely moving frictional elements in engagement with the followers, intermediate oppositely moving frictional elements, a pair of lateral followers common to all of said friction elements and springs between the lateral followers, said frictional elements being hollow to receive the lateral followers and springs, the lateral followers being in frictional engagement with the frictional elements and the frictional elements being in sliding engagement with each other.

8. In a friction draft gear for railway cars, in combination, front and rear oppositely moving friction elements, intermediate oppositely moving friction elements, lateral followers passing though said frictional elements, and springs between said lateral followers, one of said lateral followers being secured to the front frictional element and the other lateral follower being secured to the rear frictional element.

9. In a friction draft gear for railway cars, in combination, front and rear oppositely moving friction elements, intermediate oppositely moving friction elements, lateral followers passing through said frictional elements, and springs between said lateral followers, one of said lateral followers being secured to the front frictional element and the other lateral follower being secured to the rear frictional element, the said lateral followers having frictional engagement with the friction elements.

10. In a friction shock absorbing mechanism, the combination with a pair of end followers; of end friction elements each having an outer friction face coöperable with one of the followers and an inner friction face extending at an angle less than a right angle to the line of relative movement of the followers; a pair of intermediate friction elements, each of said intermediate friction elements having friction faces on the sides thereof, said faces converging and each extending at an angle less than a right angle relatively to the line of relative movement of said followers, said intermediate friction elements being oppositely arranged and the end friction elements being also oppositely arranged; and a plurality of springs interposed between said friction elements.

11. In a friction shock absorbing mechanism, the combination of end followers relatively movable toward and from each other; of a pair of end friction elements oppositely arranged; a plurality of intermediate friction elements interposed between and frictionally coöperable with each other and with the end friction elements; a pair of longitudinally extending followers disposed within said friction elements and passing from one to the other; and a plurality of springs interposed between said longitudinally extending followers.

In witness that I claim the foregoing I have hereunto subscribed my name this 26th day of May, 1919.

JOHN F. O'CONNOR.